P. MAY.
ELECTRIC MOTOR METER.
APPLICATION FILED MAR. 10, 1906.

993,310.

Patented May 23, 1911.

Witnesses

Inventor

UNITED STATES PATENT OFFICE.

PAUL MAY, OF CHARLOTTENBURG, GERMANY.

ELECTRIC-MOTOR METER.

993,310.     Specification of Letters Patent.     Patented May 23, 1911.

Application filed March 10, 1908. Serial No. 420,124.

*To all whom it may concern:*

Be it known that I, PAUL MAY, a subject of the German Emperor, and resident of Charlottenburg, Germany, have invented certain new and useful Improvements in Electric-Motor Meters, of which the following is a specification.

Electric motor meters provided with a permanent magnet and an armature rotating in its field, in consequence of the friction at the bearings and at the contact brushes indicate at a small load less than the correct reading; and no means has hitherto been provided by which in a manner resembling that of the auxiliary coil used in watt-hour meters, there can be produced an additional torque of sufficient strength, to counteract the influence of the friction on the indications of the meter during the continuance of the low load.

Various attempts have been made by means of windings arranged around the permanent magnet or on a shunt of the same, through which the current has been passed, to vary the field of the magnet in accordance with the friction factor, but the effect of such compensating windings has in most cases been but small or too large a quantity of copper has been required to produce the desired effect; while it has moreover been impossible by these means to obtain an additional torque while the load remained low.

Now, my invention relates to a device by means of which it becomes possible to obtain a greater proportional torque when the load is low than in the case of a higher load. To obtain this effect I make use of an ampere-hour meter consisting of a permanent magnet and an armature rotating in its field, the armature being connected in series or in shunt with the circuit. The connection between the armature and the circuit is effected by means of a commutator, the segments of which are divided along a helical line, so that, when the brushes are moved axially along the commutator, the direction of the lines of force of the armature field is changed with regard to those of the field of the permanent magnet. I arrange the commutator segments so, that the torque produced by a current of certain strength is a maximum when the brushes are nearest the armature core and is diminished when the brushes are removed from the same. The brushes are provided on one end of a two-armed lever, on the other end of which is fastened a coil, through which the current passes and which is influenced by a permanent magnet so as to move the brushes along the commutator when the strength of the current will change.

My invention will be best understood with reference to the accompanying drawings, in which like parts are signified by like figures and of which—

Figure 1:
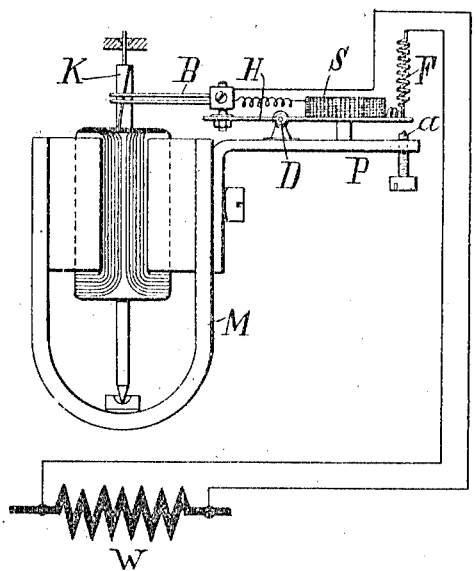
Figure 2:
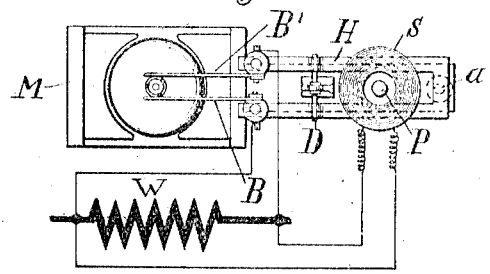

Figures 1 and 2 are diagrammatic views of two forms of ampere-hour-meters embodying my invention.

In Fig. 1, M is a permanent magnet, in the field of which rotates an armature which is connected in parallel with the resistance W. B and $B^1$ are the brushes, K is a commutator, P is a pole piece, which is polarized by the permanent magnet. The brushes are attached to a two-armed lever H pivoted at D, one arm of which carries the coil S. The current is conducted to the coil S from the resistance W by means of the spring F. The end of the coil S is connected with the brush $B^1$, the other brush, B, being connected by means of a fine wire spring with the other end of the resistance W, the coil S and the armature being consequently connected in series. The proportions are so chosen that in the case of a very weak current such for instance as a current of only 1% of the maximum, the coil S will fail to act on the lever H. The segments of the commutator are helical and the pitch of the screw may be so chosen that the commutating position of the armature varies in proportion with the height at which the brushes are caused to lie on the commutator by the action of the coil S.

In operation, when the maximum current passes through the resistance W, the coil S draws the lever H down so far that a contact piece thereon makes contact with the screw A, with the result that the brushes are caused to assume a certain position on the commutator, while the attractive force of the coil can be easily made sufficiently great to retain the lever H in the contact position even when the current strength in the resistance W has sunk, for example, to half of the maximum load. Within these load limits the torque of the armature depends solely on the current which flows through it and on the constant field of the permanent magnet. Should the current in the resistance W, however, sink to below one-half of the maximum load the friction, in a meter of ordinary construction, will begin prejudicially to effect the correctness of the indications, and the interference of friction will increase as the load decreases. If, on the other hand, the meter is provided with a device in accordance with this invention the armature will now obtain an additional torque which increases with the diminution of the load. This is due to the fact that below a certain load, say one-half of the maximum, the coil S will move slowly upward whenever the current in the resistance W decreases, while the brushes B and B¹ will consequently be caused to lie lower on the commutator and as a result of the helical shape of the commutator-segments, the relative position of the lines of force of the armature-field and the lines of force of the permanent magnet in these low positions will be more favorable, and it may easily be seen that by suitably choosing the proportions of the effective parts the calibration curve of the meter can without difficulty be kept within the limits of 1% for each point of the load. For the purpose of effecting a reliable start even at minimum loads such a device in connection with ampere-hour meters offers great advantages as it enables the number of windings and the weight of the armature to be reduced and the current flowing through the armature to be diminished with the result that the commutator will be subjected to much less wear.

Fig. 2 shows a different method of connecting up the coil S, which is in this instance connected in parallel to the armature.

What I claim and desire to be secured by Letters Patent is:

In an electric meter a permanent magnet for creating a field of force, a rotatable armature in this field being connected in series relation with the load, a commutator having segments these being divided along a helical line, brushes connecting the commutator segments with the circuit and arranged on a lever and means for turning the lever under the influence of the strength of the current flowing in the load circuit.

In testimony whereof I have signed my name to this specification in the presence of two subscribing witnesses.

PAUL MAY.

Witnesses:
JULIUS RUNELAND,
GUILFORD BÖRNING.